Dale R. Maley,
INVENTOR.

Feb. 18, 1969     D. R. MALEY     3,427,861
NONDESTRUCTIVE TESTER
Filed July 28, 1965     Sheet 2 of 2

Dale R. Maley,
INVENTOR.
BY.
[signature]
ATTORNEY.

United States Patent Office 3,427,861
Patented Feb. 18, 1969

3,427,861
NONDESTRUCTIVE TESTER
Dale R. Maley, Boulder, Colo., assignor to Automation Industries, Inc., El Segundo, Calif., a corporation of California
Filed July 28, 1965, Ser. No. 475,479
U.S. Cl. 73—15    10 Claims
Int. Cl. G01n 25/20

ABSTRACT OF THE DISCLOSURE

The disclosure includes a nondestructive tester wherein a heat transfer zone on the surface of the workpiece is heated to transfer thermal energy into the interior of the workpiece whereby the surface temperature varies as a function of the internal characteristics of the workpiece. A radiometer scans the surface of the heat transfer zone whereby a signal is produced that is a function of the characteristics of the workpiece.

---

Figure 1:
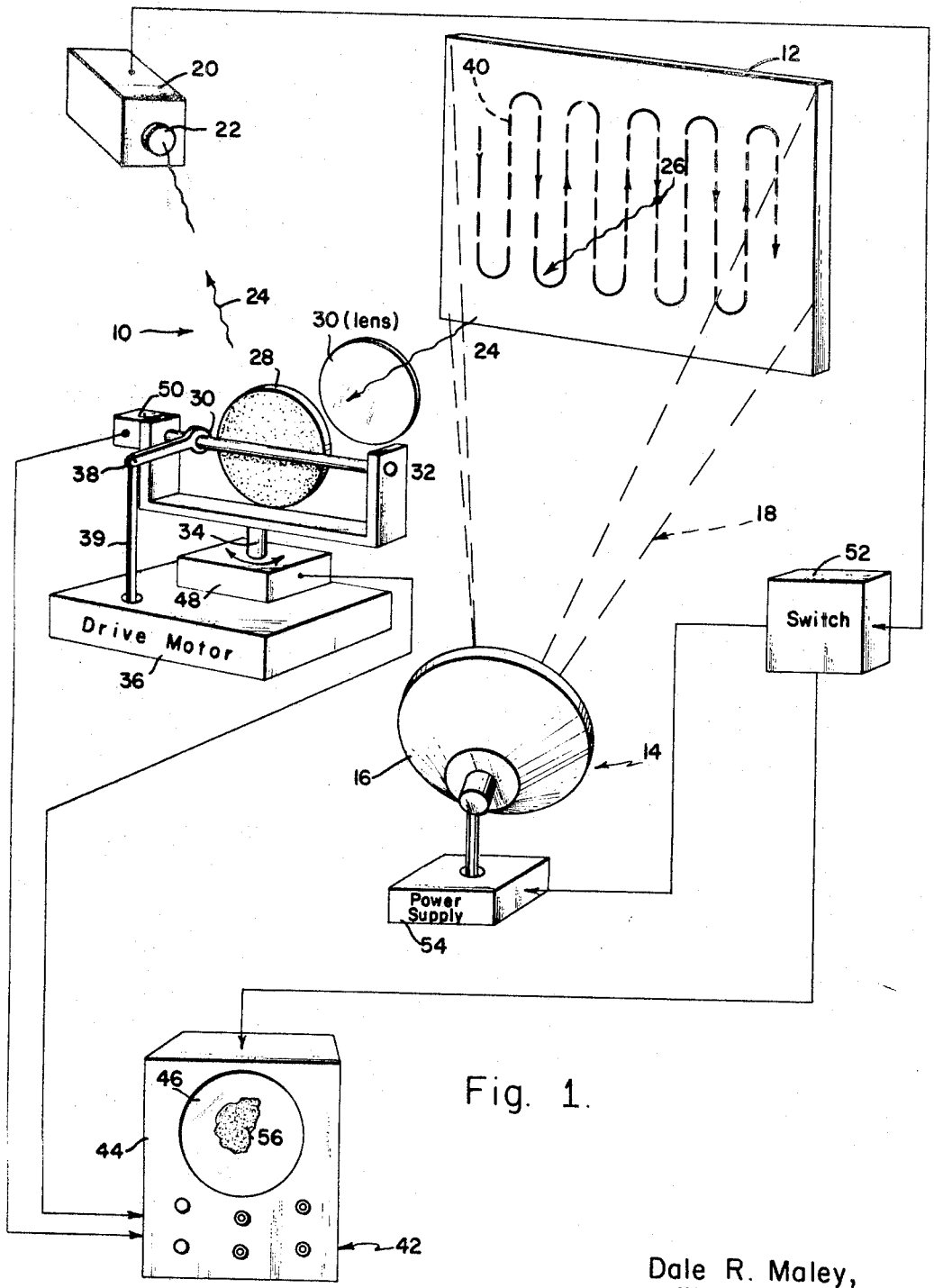

One form of nondestructive tester that has been recently developed for inspecting workpieces for internal defects is the so-called IR or infrared system. In an infrared nondestructive testing system, heat is transferred through the workpiece and the temperatures of the incremenal areas on the surface of the workpiece are measured. The rate at which the heat flows through the workpiece is a function of the thermal conductivity thereof. If there are any local discontinuities in the workpiece, for example a void, inclusion, delamination, lack of bonding, etc., there is a corresponding local variation in the thermal conductivity of the workpiece. This, in turn produces a corresponding local variation in the rate of heat transfer whereby the temperatures of one or more of the incremental areas will differ from the surrounding temperatures. Thus, by measuring the temperatures of the incremental areas on the surface of the workpiece, it is possible to locate hidden defects, etc.

Testers of the foregoing type are disclosed and claimed in co-pending application, Ser. No. 474,811, Material Tester, filed July 26, 1965, in the name of Dale R. Maley, Ser. No. 474,661, Material Tester, filed July 26, 1965, in the name of Dale R. Maley, Ser. No. 474,709, Material Tester, filed July 26, 1965, in the name of Dale R. Maley, and Ser. No. 474,593, Material Tester, filed July 26, 1965, in the name of Dale R. Maley, all of said applications being assigned of record to Automation Industries, Inc., the assignee of the present invention. In these testers, a beam of energy is focused into a "hot spot" on the surface of the workpiece. This "hot spot" is of a relatively small size and travels across the surface of the workpiece whereby heat is transferred into successive portions thereof. A radiometer focused on the surface of the workpiece defines a "scan spot" that is displaced a predetermined distance behind the "hot spot." The radiometer thereby provides an electrical signal corresponding to the rate at which the temperature of the workpiece returns to ambient after the heat has been transferred thereto via the "hot spot." Since the thermal conductivity of the workpiece is a function of the characteristics of the workpiece, the electrical signal is also a function of the characteristics of the workpiece.

Prior art infrared testers, particularly of the foregoing type, are well adapted to detect and locate internal defects in a workpiece. However, it has been found that due to practical limitations, the rate at which the surface can be scanned by the "hot spot" has been relatively slow. In addition, prior art infrared testers have produced signals which are difficult to employ for certain types of output displays. More particularly, the prior art systems have required a large amount of attention by the operator and a large amount of operator interpretation. As a consequence, prior art infrared testers are relatively slow and subject to human error whereby they have not found wide commercial usage.

The present invention provides means for overcoming the foregoing difficulties. More particularly, the present invention provides an infrared tester particularly adapted for commercially inspecting workpieces on a production line basis. This is accomplished by providing means capable of accurately, reliably and rapidly scanning the surface of a workpiece at a high rate of speed, and capable of providing a display that is easily observed and comprehended whereby very little operator skill or interpretation is required.

In the limited number of embodiments disclosed herein, an infrared test system is provided wherein a heater or similar device simultaneously transfers heat into the entire workpiece or a large portion thereof. The heat is substantially uniformly transferred throughout all parts of the heated area whereby the surface temperature will be uniform if the workpiece is uniform. However, if there are any irregularities in the workpiece there will be corresponding variations in the temperatures on the surface of the workpiece. Radiometer means are provided for measuring the various incremental temperatures in rapid succession. The entire heated area is scanned in a very short interval and a signal produced that corresponds to the surface temperature. This signal is coupled into a suitable display means such as a cathode ray tube whereby a visual display can be readily observed by the operator.

This arrangement permits the surface of the workpiece to be scanned at a high rate of speed and the entire workpiece inspected in a very short interval.

Figure 2:
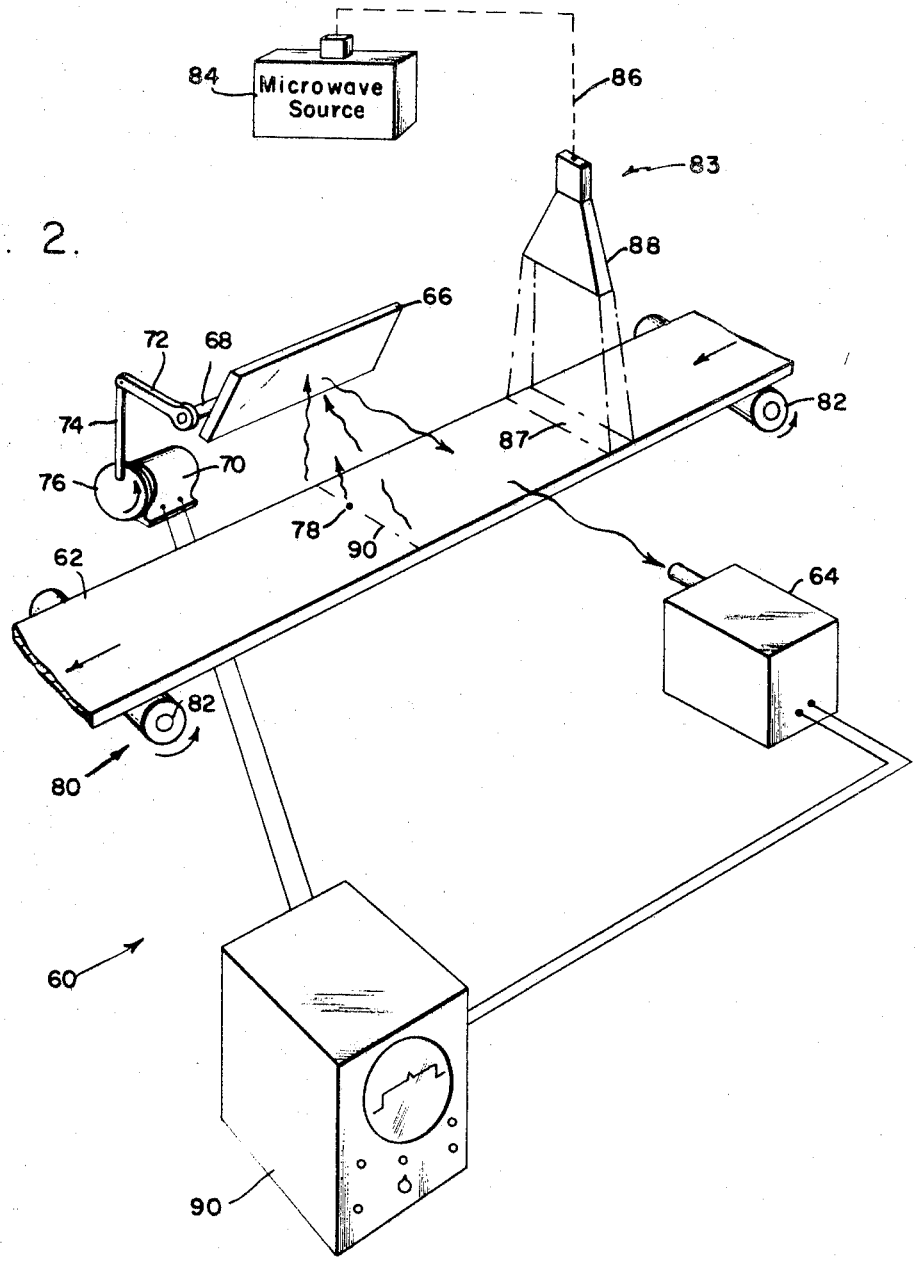

These and other features and advantages of the present invention will become readily apparent from the following detailed description of a limited number of embodiments thereof, particularly when taken in connection with the accompanying drawings wherein like reference numerals refer to like parts and wherein:

FIG. 1 is a perspective block diagram of one tester embodying one form of the present invention, and FIG. 2 is a perspective block diagram of another tester embodying another form of the present invention.

Referring to the drawings in more detail and particularly to FIG. 1, the present invention is particularly adapted to be embodied in a nondestructive system 10 for inspecting a workpiece 12 for hidden defects, and/or for measuring the various dimensions thereof, etc. For purposes of illustration, the present workpiece 12 is shown as a relatively flat member such as a panel or a sheet of metal. It should be understood, however, that any type of workpiece may be employed.

The workpiece 12 may be mounted on a support structure (not shown) for retaining it in position during a test. In this instance, the workpiece 12 is maintained in a fixed position throughout the test. However, as will become apparent, under some circumstances it may be desirable to move the workpiece 12 during the test.

To test or inspect the workpiece 12, heat is transferred through the workpiece 12 so that the temperatures of the various incremental areas on the surface of the workpiece 12 will be functions of the characteristics of the workpiece 12 immediately adjacent to the incremental areas. The transfer of heat may be accomplished by any suitable means such as a radiator 14 positioned adjacent to the workpiece 12. The radiator 14 is effective to radiate some suitable form of energy such as microwave energy and/or infrared energy. For reasons that will become apparent subsequently it has been found desirable for the radiated energy to be primarily in the visible range or in the so-called near infrared region.

A reflector 16 or similar device may be provided for focusing the energy into a beam 18 aimed at the surface of the workpiece 12 whereby the energy will be incident upon an extended area. This area may include the entire surface or just a portion thereof. The beam 18 distributes substantially uniformly throughout the entire extended area.

The amount of heat or energy in the beam 18 will, of course, depend upon the type of material, the rate at which a test is made, etc. However, the amount of energy in the beam 18 is normally suitable for producing a relatively small temperature rise, for example, in the region of about 50° more or less above the ambient temperature. With a temperature rise of this magnitude, the radiations from the surface will have a wave length in the general region of about 2 to 15 microns. It can be appreciated that under these circumstances, energy radiated from the surface of the workpiece 12 will be entirely outside of the range of the visible or near infrared energy radiated in the beam 18 onto the surface of the workpiece 12.

A portion of the energy incident upon the surface of the workpiece 12 is coupled into the workpiece 12 and transformed into thermal energy. A large part of this thermal energy is conducted into and throughout the workpiece 12. However, a substantial portion of the energy remains immediately adjacent to the surface Some of this energy is re-radiated from the surface in the form of infrared energy. The intensity and wave length of the re-radiated energy is dependent upon the temperature of the particular radiating portion or incremental area.

The temperatures of the incremental areas are, of course, dependent upon the rate at which the heat is conducted through the workpiece 12. The temperature will thus be largely controlled by the type of material. However, it will also be affected by the difference between the temperatures on the opposite sides of the workpiece, the thickness of the workpiece, the presence of inclusions, voids, delaminations, lack of bonding, etc.

If there are any localized discontinuities in the workpiece 12 such as a delamination, a void, etc., there will be a higher thermal impedance in the region of this discontinuity and the temperature of that localized portion of the surface will be somewhat higher than the temperatures of the surrounding areas. It will thus be seen that the temperatures of the individual incremental areas on the surface of the workpiece are functions of the characteristics of the portions of the workpiece 12 immediately adjacent to the various incremental areas.

The temperatures of the incremental areas may be measured by any suitable form of pickup means. However, in the present instance a so-called radiometer 20 is employed to receive infrared energy radiated from the surface, and provide an electrical signal corresponding to the magnitude of the radiations. As indicated before, the temperature rise is on the order of about 50° more or less above ambient and the re-radiated infrared energy has a wave length in a region of up to about 15 microns. It may be appreciated that the radiometer 20 should be sensitive to radiations in this region.

Normally, a lens system 22 is included in the radiometer 20 or is associated therewith to focus the infrared radiations. This permits the radiometer 20 to receive only radiations which are traveling along a relatively narrow path or beam 24 and which originate from a small incremental area. The incremental area sensed by the radiometer 20 is hereinafter referred to as the "scan spot" 26.

Means are provided for making this beam 24 so that the incremental area or "scan spot" 26 scans across the surface of the workpiece 12 in some preselected pattern. Although this may be accomplished by moving the radiometer 20, it has been found desirable to maintain the radiometer 20 stationary and employ a suitable scan mechanism such as a reflecting mirror 28 for deflecting the beam 24. The mirror 28 is positioned in alignment with the axis of the lens system 22 on the radiometer 20 and in front of the workpiece 12. Only the radiations emanating from a particular incremental area or "scan spot" 26 will be reflected from the mirror 28 and into the radiometer 20. In order to assist in this reflection and to improve the resolution of the incremental area, it has been found desirable to provide an additional infrared lens 30 between the surface and the reflecting mirror 28.

It is, of course, readily apparent, that the location of the "scan spot" 26 aligned with the radiometer 20 is dependent upon the angular position of the mirror 28. Accordingly, in the present instance, the "scan spot" 26 is moved across the surface of the workpiece 12 by causing the mirror 28 to move through some predetermined pattern. This is accomplished by mounting the mirror 28 upon a rocker shaft 30 carried by an oscillating yoke.

The yoke 32 is mounted upon a vertical shaft 34 which extends into a drive mechanism 36. When the mechanism 36 is operative, the vertical shaft 34 oscillates about its axis and carries the yoke 32 therewith. This, in turn, causes the mirror 28 to oscillate around the vertical axis whereby the "scan spot" is moved horizontally across the workpiece 12 from one end to the other.

The rocker shaft 30 includes an arm 38 which projects therefrom and is attached to a push rod 39. The lower end of the push rod 39 extends into the drive mechanism 36 and is coupled thereto. This form of operation causes the mirror 28 to oscillate about the horizontal axis of the shaft 30 and cause the "scan spot" 26 to move vertically between the upper and lower edges of the workpiece 12. It will thus be seen that the combination of these two motions will cause the "scan spot" 26 to scan the heated area. Normally, the vertical oscillations occur at a higher rate than the horizontal oscillations. The "scan spot" 26 will thereby follow a pattern similar to that disclosed by the dotted line 40.

The output of the radiometer 20 is coupled to a suitable display means 42 for indicating the characteristics of the workpiece 12 as determined by the variations in the radiometer signal. Although a wide variety of output means may be employed in the present instance for the purposes of illustration, the display means 42 is shown as including an oscilloscope 44 having a cathode ray tube 46. The electron beam is scanned across the face of the tube 46 in synchronism with the motion of the "scan spot" 26 to form a raster. The intensity of the beam is modulated in accordance with the radiation signal.

Synchronizing the scan of the oscilloscope 44 is accomplished by providing X and Y signal corresponding the X–Y position of the "scan spot" 26. A first potentiometer 48 is coupled to the yoke 32 so as to produce a signal proportional to the angular rotation of the yoke 32. This signal is also proportional to the horizontal of X position of the "scan spot" 26 on the workpiece 12. This signal is coupled to one of the deflection means in the oscilloscope 44, for example, the horizontal or X deflection plates. Thus, the horizontal deflection of the electron beam will correspond to the X position of the "scan spot" 26.

A second potentiometer 50 is mounted on the yoke 32 and connected to the horizontal shaft 30 carrying the mirror 28. This potentometer 50 will thereby produce a signal proportional to the angular tilt of the mirror 28, and, therefore, the vertical of Y position of the "scan spot" 26. The potentiometer 50 is coupled to the other deflection means in the oscilloscope 44, i.e., the vertical or Y deflection plates. It will thus be seen that the cathode ray beam will be incident upon the face of the tube 46 at a point which corresponds to the position of the "scan spot" 26. Thus, as the "scan spot" 26 traverses back and forth across the workpiece 12, the electron beam will scan across the same pattern on the face of the oscilloscope 44 and thereby form a raster.

The control grid of the oscilloscope tube 46 is coupled to the radiometer 20 whereby the intensity of the electron beam is modulated in accordance with the temperature of the workpiece 12. The resultant raster on the face of the tube 46 will thus be a thermal map of the workpiece 12. In the event that there is a localized discontinuity such as an inclusion, void, delamination, etc., there will be a corresponding area on the surface of the workpiece 12 wherein the incremental areas are at an elevated temperature in comparison with the other incremental areas. This will produce a corresponding display on the face of the tube 46 whereby its characteristics can be readily determined.

In order to employ the tester 10 of FIGURE 1, a workpiece 12 to be inspected may be positioned in alignment with the heater 14 and the scan mechanism. The power supply 54 is then energized whereby the radiator 14 radiates heat onto the surface of the workpiece 12. The radiator 14 and the radiated beam 18 are arranged so that the heat will be substantially uniformly distributed over the entire area of the workpieec 12. The amount of heat transferred into the various incremental areas will be substantially uniform and normally in a range that produces a temperature rise on the order of about 50° F. more or less above ambient.

A large portion of the incident heat flows through the workpiece 12 towards the back side thereof at rates determined by the characteristics of the workpiece 12 immediately adjacent to the point of incidence. The temperatures of the incremental areas on the surface of the workpiece 12 therefor correspond to the characteistics of the workpiece 12 immediately adjacent to the incremental area. The resultant infrared radiations radiated from the incremental will therefor correspond to the internal characteristics. As the radiometer 20 receives the radiations, it will produce a radiation signal that, in turn, corresponds to these characteristics. It has been found desirable for the heat in the beam 18 to be in the visible or near infrared region so that it is entirely outside of the wave lengths of the radiations from the incremental areas produced by the temperature changes. This will prevent the radiations from the heater 14 interfering with the radiometer 20 receiving the radiations corresponding to the temperature of the "scan spot." After a sufficient quantity of heat has been transferred into the workpiece 12 to produce a change of temperature, the radiometer 20 scans the workpiece 12 and senses the temperatures of the incremental areas as a result of the mirror 28 oscillating.

Since the radiations received by the radiometer 20 are entirely outside of the radiations produced by the heater 14, the scanning may occur simultaneously with the heating. In this event, the radiation signal will correspond to the rate at which the temperature rises or the temperature at which it eventually stabilizes. However, under some circumstances, it may be desirable to measure the rate at which the workpiece 12 cools off after it has been heated. In this event, a switch 52 may be coupled between the radiometer 20 and the oscilloscope 44. This switch 52 is effective to control operation of the heater 14, and also the coupling of the radiometer 20 to the oscilloscope 44. The switch 52 may be set to energize the power supply 54 for a predetermined interval of time adequate to heat the workpiece 12 to a preselected level. Following this, the switch 52 turns the power supply 54 "OFF" and couples the radiometer 20 to the oscilloscope 44 as the mirror 28 oscillates and scans the workpiece 12. The resultant radiation signal corresponds to the rate at which the surface is cooling. Alternatively, the switch 52 may cause the power supply 54 to be energized concurrently with the coupling of the radiometer 20 to the oscilloscope 44.

In either mode of operation, the radiation signal is coupled to the oscilloscope 44 and modulates the intensity of the beam. At the same time, the beam will scan the face of the tube 46 in synchronism with the motion of the "scan spot" 26. The resultant raster will be a thermal map of the workpiece 12. In the event there is a delamination or other defect there will be a corresponding hot or cold area on the surface of the workpiece 12. This will produce a corresponding display such as the bright area 56. The operator can thus quickly view the oscilloscope 44 and determine whether the workpiece 12 is acceptable. In the event a permanent record is required, a photograph may be made of the display.

Although the foregoing system 10 is capable of performing an effective test, it has been found desirable, under some circumstances, to employ an embodiment such as shown in FIG. 2. The second embodiment 60 is particularly adapted to test an elongated continuous strip such as a sheet of steel 62. Although the test may be made at any time, this embodiment is particularly useful for inspecting a sheet of steel 62 at the time it is being fabricated, for example, at the time it is being rolled.

This embodiment 60 is very similar to the preceding system 10 in that it includes a radiometer 64 for scanning the surface of the workpiece 62. Although the radiometer 64 may be moved so as to scan the surface, in the present instance a mirror 66 is mounted on a rocker shaft 68 adjacent one side of the workpiece 62. The shaft 68 is coupled to a drive motor 70 by means of a rocker arm 72, a connecting rod 74 and a rotating disc 76. As the motor 70 rotates the mirror 66 will oscillate back and forth about the axis of the shaft 68.

The radiometer 64 is positioned so as to receive reflections of the radiations from a "scan spot" 78 on the surface of the workpiece 62. As the mirror 66 oscillates, the "scan spot" 78 scans laterally back and forth across the workpiece 62. At the same time, the workpiece 62 is advanced by a conveyor means 80 such as the rollers 82. It will be seen that this combination of movement will be effective to provide a continuous scan of all portions of the workpiece 62.

In the event that the manufacturing process causes the temperature of the workpiece 62 to be above the surrounding ambient temperature (for example, a rolling operation), the inspection system 60 may be located at a point where the workpiece 62 is cooling. Under these circumstances, the system 60 will be capable of monitoring the rate of cooling of the workpiece 62 without applying any heat thereto. However, in the event that the temperature of the workpiece 62 does not vary naturally, a suitable heater 83 may be provided. In the present instance, the heater includes a microwave source 82, a waveguide transmission line 86 and a radiator 88 aligned with an exposed surface or the workpiece 62. It is emphasized that the other heating means, such as visible radiation, could also be used. During a testing operation radiated electromagnetic energy will be incident upon the workpiece 62 and effective to continuously supply heat thereto over the entire width of the workpiece. As a consequence, by the time the workpiece 12 reaches the inspection station, it will have been heated to some predetermined extent and will be in the process of cooling. The time duration of the cooling will be a function of the time required to travel from the heater 83 to the scan line 78. As a consequence, the temperatures of the incremental areas on the workpiece 62 at the inspection station will be a function of the internal characteristics of the workpiece 62.

In order to employ this embodiment of the tester 60, the workpiece such as a continuous strip 62 is transported along the conveyor 80 at some predetermined speed. The motor 70 oscillates the mirror 66 whereby the radiometer 64 will progressively scan the surface of the workpiece 62 and produce a radiation signal corresponding to the temperatures in the inceremental areas. The resultant signal may be coupled into an oscilloscope 90 whereby the operator can readily observe the characteristics of the workpiece.

It will thus be seen that in a tester embodying the present invention, the rate at which the heat is applied to the workpiece and/or the rate at which the workpiece cools is independent of the rate at which the temperatures of the incremental are scanned by the radiometer. As a consequence, large areas of the workpieces may be heated and, simultaneously or subsequently thereto, the surface may be rapidly scanned at an extremely high rate of speed by the radiometer. As a consequence of being capable of scanning large areas of a workpiece in a very short period of time, it is now possible to inspect workpieces on a commercial basis without reducing the speed of a production process.

While only a limited number of embodiments of the present invention are disclosed herein, it will be readily apparent to persons skilled in the art that numerous changes and modifications may be made thereto without departing from the spirit of the invention. Accordingly, the foregoing disclosure and description thereof are for illustrative purposes only, and do not in any way limit the invention which is defined only by the claims which follow.

I claim:
1. A nondestructive tester for detecting a characteristic of a workpiece, said tester including the combination of:
   radiating means uniformly illuminating an energy transfer zone of said workpiece with radiant energy in a first frequency band,
   pickup means for receiving radiation at a second frequency band and producing an electrical signal corresponding thereto, said pickup means being focused to only receive radiations from an incremental area on the surface of the workpiece whereby the electrical signal is a function of radiation emitted by the surface of the incremental areas within said energy transfer zone,
   scan means coupled to the pickup means for scanning the pickup means over a substantial portion of the energy transfer zone while energy is being transferred into said workpiece whereby the signal from the radiation pickup means varies as a function of the surface temperatures of the incremental areas, and
   output means connected to said pickup means and said scan means.

2. The nondestructive tester of claim 1 wherein:
   said radiating means projects thermal energy onto said transfer zone whereby thermal energy is transferred into said zone.

3. The nondestructive tester of claim 2 wherein:
   said radiating means is effective to project to a beam frequency band, and
   the pickup means is primarily responsive to infrared radiations in a second frequency band.

4. The nondestructive tester of claim 1 including:
   output means coupled to the pickup means and responsive to the signal therefrom for producing an indication of the heat transfer characteristics of the workpiece.

5. The nondestructive tester of claim 4 wherein the output means includes scan means coupled to the first scan means.

6. The nondestructive tester of claim 5 wherein the output means includes an oscilloscope.

7. A nondestructive tester for detecting a characteristic of a workpiece, said tester including the combination of:
   a radiometer sensitive to a frequency band for receiving thermal radiations and producing an electrical signal corresponding to the intensity of said radiations,
   focusing means for focusing the radiometer onto an incremental area on the surface of the workpiece whereby the amplitude of said signal is a function of the intensity of said radiations,
   radiating means illuminating the surface of the workpiece with another frequency band for transferring thermal energy into said workpiece, and
   scan means coupled to the radiometer for scanning the radiometer over the surface of the workpiece whereby a large area of the surface of the workpiece is scanned while thermal energy is being transferred into the workpiece,
   output means connected to said radiometer and to said scan means.

8. The nondestructive tester of claim 7 wherein:
   said radiating means projects thermal energy in a first of energy onto a heat transfer zone on the surface of the workpiece, said heat transfer zone including at least a portion of the large area being scanned by the pickup means.

9. A method of nondestructively inspecting a workpiece for its internal characteristics, said method including the steps of:
   illuminating said workpiece with radiant energy in a first frequency band over an enlarged heat transfer zone, thereby heating said workpiece,
   receiving thermal radiations in a second frequency band from an incremental area in said heat transfer zone while said energy is being transferred therethrough and generating a signal corresponding to the surface temperatures of the heat transfer zone,
   scanning said incremental area over the heat transfer zone, and
   indicating the scanned thermal radiations from said incremental area.

10. A nondestructive tester for detecting a characteristic of a workpiece, said tester including the combination of:
    transport means for transporting said workpiece along a predetermined path in a first direction,
    a radiant energy source projecting a beam of energy in a first frequency band onto said workpiece whereby said workpiece is heated over a heat transfer zone, said heat transfer zone extending transversely across the workpiece at substantially right angles to said path and advancing longitudinally of the workpiece as the transport means moves the workpiece past said radiant energy source,
    infrared pickup means for receiving infrared radiations in a second frequency band from the surface of the workpiece and producing an electrical signal which is a function of radiation from the surface of said workpiece,
    scan means for scanning the pickup means transversely across the workpiece at substantially right angles to the direction of movement of the workpiece as it is carried by the transport means to form a scan zone on the surface of the workpiece, said scan zone being displaced a predetermined distance behind the heat transfer zone whereby the area upon which the pickup means is focused has traveled said predetermined distance between the time it is heated and the time it is scanned, and
    output means connected to said infrared pickup means and said scan means.

References Cited
UNITED STATES PATENTS 3,020,745    2/1962    Sielicki _____ 73—15
3,210,546    10/1965    Perron _____ 250—83.3

RICHARD C. QUEISSER, *Primary Examiner.*

E. D. GILHOOLY, *Assistant Examiner.*

U.S. Cl. X.R.

250—83.3